(12) United States Patent
Taori

(10) Patent No.: US 12,581,533 B2
(45) Date of Patent: Mar. 17, 2026

(54) MEDIUM ACCESS METHODS FOR AMBIENT POWER (AMP) DEVICES

(71) Applicant: Cypress Semiconductor Corporation, San Jose, CA (US)

(72) Inventor: Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 305 days.

(21) Appl. No.: 18/512,369

(22) Filed: Nov. 17, 2023

(65) Prior Publication Data

US 2025/0024491 A1     Jan. 16, 2025

Related U.S. Application Data

(60) Provisional application No. 63/512,840, filed on Jul. 10, 2023.

(51) Int. Cl.
| *H04W 74/0808* | (2024.01) |
| *H04W 12/062* | (2021.01) |
| *H04W 84/12* | (2009.01) |

(52) U.S. Cl.
CPC ..... *H04W 74/0808* (2013.01); *H04W 12/062* (2021.01); *H04W 84/12* (2013.01)

(58) Field of Classification Search
CPC ........... H04W 74/0808; H04W 12/062; H04W 84/12
See application file for complete search history.

(56) References Cited

U.S. PATENT DOCUMENTS

| | | | | |
|---|---|---|---|---|
| 8,305,885 | B2 * | 11/2012 | Ji | H04W 74/0816 |
| | | | | 370/395.42 |
| 9,489,813 | B1 * | 11/2016 | Beigel | G08B 13/2417 |
| 9,888,337 | B1 * | 2/2018 | Zalewski | G06Q 30/0635 |
| 9,911,290 | B1 * | 3/2018 | Zalewski | H04W 76/10 |
| 10,484,477 | B2 * | 11/2019 | Nasir | H04L 67/125 |
| 10,826,335 | B2 * | 11/2020 | Cheatham, III | H04W 64/003 |
| 10,880,743 | B1 * | 12/2020 | Berzin | H04L 41/0806 |
| 12,412,465 | B1 * | 9/2025 | Daoura | G08B 21/24 |
| 12,457,557 | B2 * | 10/2025 | Butt | H04W 52/0261 |

(Continued)

FOREIGN PATENT DOCUMENTS

| | | | | | |
|---|---|---|---|---|---|
| WO | WO-2024088583 | A1 * | 5/2024 | | H02J 50/001 |
| WO | WO-2024197621 | A1 * | 10/2024 | | H04B 1/7136 |

(Continued)

*Primary Examiner* — Michael J Moore, Jr.

(57) ABSTRACT

A method includes transmitting, by an anchor wireless device, a beacon frame signal to client wireless devices, which are ambient power (AMP) devices. The beacon frame signal advertises at least a first service period during which at least a subset of the client wireless devices are to transmit. The method includes transmitting, by the anchor wireless device, during the first service period, a first wireless signal including a data packet with a command frame to activate the subset of the client wireless devices into a transmission mode. The method includes receiving, from the subset of the client wireless devices in response to detecting the command frame, second wireless signals each including a response data packet. The second wireless signals are received according to a pre-programmed schedule that deconflict transmissions by the subset of the client wireless devices.

22 Claims, 11 Drawing Sheets

900

Transmit a beacon frame signal to client wireless devices (e.g., AMP STAs), where the beacon frame signal is to advertise at least a first service period during which at least a subset of client wireless devices are to transmit.     910

Transmit, during the first service period, a first wireless signal including a data packet with a command frame to activate the subset of client wireless devices into a transmission mode.     920

Receive, from the subset of client wireless devices in response to detecting the command frame, second wireless signals each including a response data packet, where the second wireless signals are received according to a pre-programmed schedule that deconflict transmissions by the subset of client wireless devices.     930

(56)     References Cited

U.S. PATENT DOCUMENTS

| | | | |
|---|---|---|---|
| 2016/0178727 A1* | 6/2016 | Bottazzi ................ | G06Q 30/06 |
| | | | 375/130 |
| 2019/0087771 A1* | 3/2019 | Westphal ............... | G06Q 10/08 |
| 2024/0306098 A1* | 9/2024 | MolavianJazi ..... | H04W 52/365 |
| 2024/0356375 A1* | 10/2024 | Henry .................... | H02J 7/342 |
| 2025/0024491 A1* | 1/2025 | Taori .................... | H04W 84/18 |
| 2025/0294615 A1* | 9/2025 | Xu .......................... | H04W 8/22 |

FOREIGN PATENT DOCUMENTS

| | | | | |
|---|---|---|---|---|
| WO | WO-2025007281 A1 * | 1/2025 | ............ | H04W 52/02 |
| WO | WO-2025007283 A1 * | 1/2025 | ............. | H04W 8/14 |
| WO | WO-2025007358 A1 * | 1/2025 | ............. | H04W 8/14 |

* cited by examiner

200

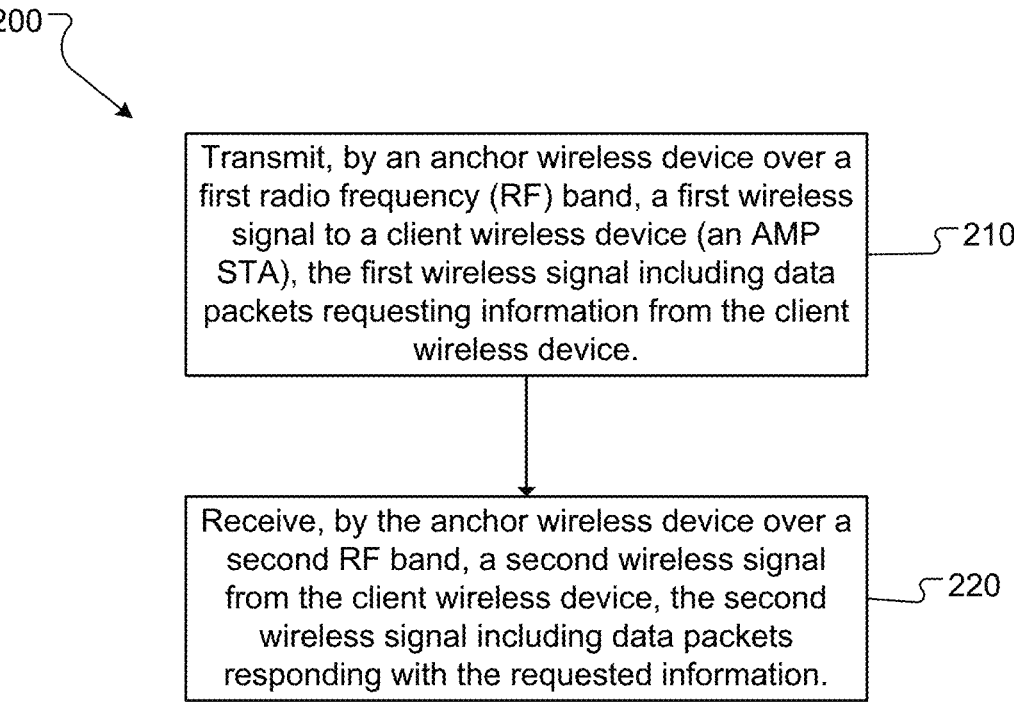

Transmit, by an anchor wireless device over a first radio frequency (RF) band, a first wireless signal to a client wireless device (an AMP STA), the first wireless signal including data packets requesting information from the client wireless device. ⌐210

Receive, by the anchor wireless device over a second RF band, a second wireless signal from the client wireless device, the second wireless signal including data packets responding with the requested information. ⌐220

FIG. 2

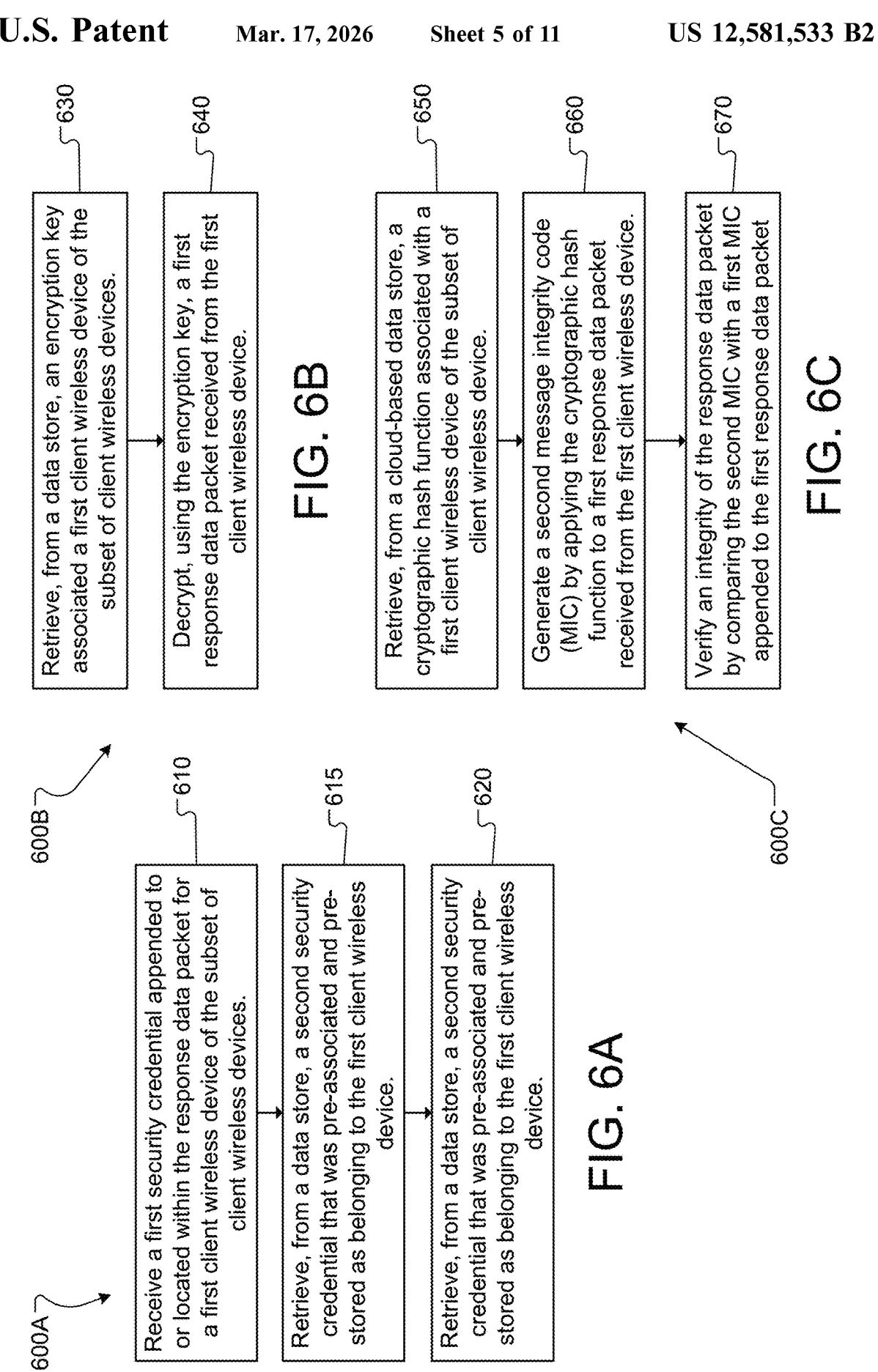

600A

610
Receive a first security credential appended to or located within the response data packet for a first client wireless device of the subset of client wireless devices.

615
Retrieve, from a data store, a second security credential that was pre-associated and pre-stored as belonging to the first client wireless device.

620
Retrieve, from a data store, a second security credential that was pre-associated and pre-stored as belonging to the first client wireless device.

630
Retrieve, from a data store, an encryption key associated a first client wireless device of the subset of client wireless devices.

640
Decrypt, using the encryption key, a first response data packet received from the first client wireless device.

650
Retrieve, from a cloud-based data store, a cryptographic hash function associated with a first client wireless device of the subset of client wireless device.

660
Generate a second message integrity code (MIC) by applying the cryptographic hash function to a first response data packet received from the first client wireless device.

670
Verify an integrity of the response data packet by comparing the second MIC with a first MIC appended to the first response data packet

FIG. 6C

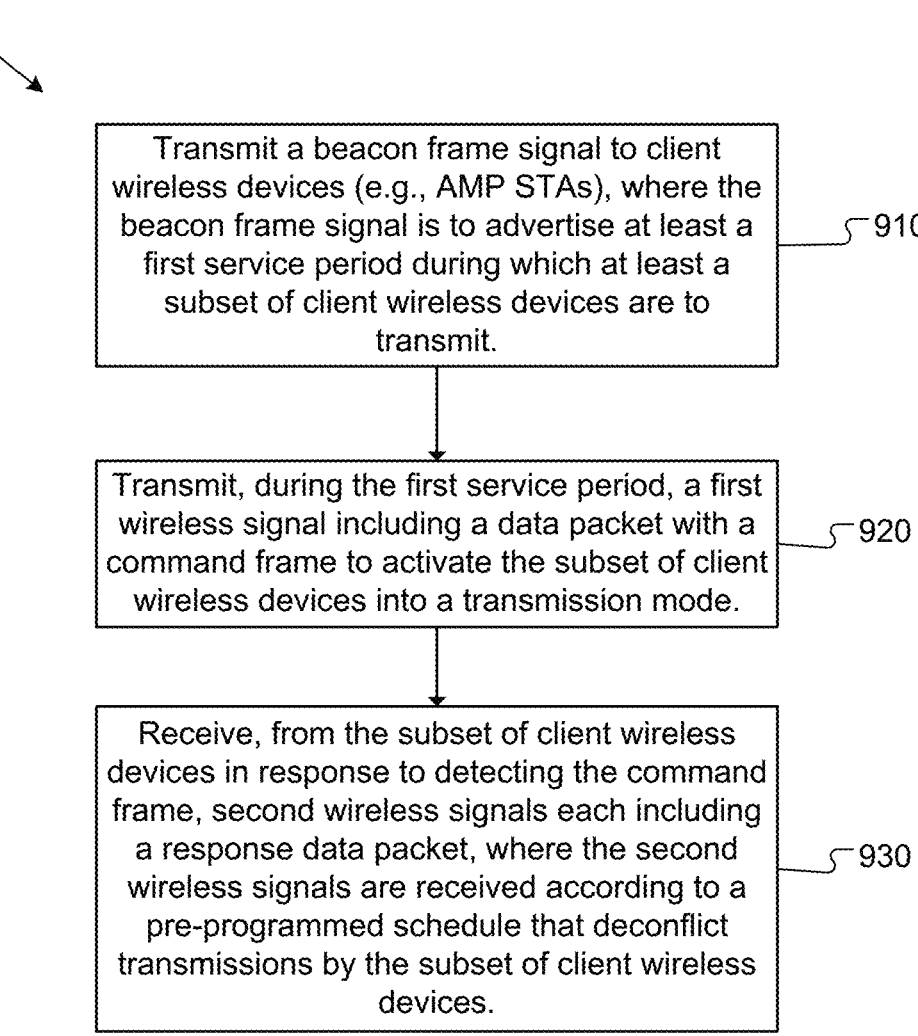

900

Transmit a beacon frame signal to client wireless devices (e.g., AMP STAs), where the beacon frame signal is to advertise at least a first service period during which at least a subset of client wireless devices are to transmit.

910

Transmit, during the first service period, a first wireless signal including a data packet with a command frame to activate the subset of client wireless devices into a transmission mode.

920

Receive, from the subset of client wireless devices in response to detecting the command frame, second wireless signals each including a response data packet, where the second wireless signals are received according to a pre-programmed schedule that deconflict transmissions by the subset of client wireless devices.

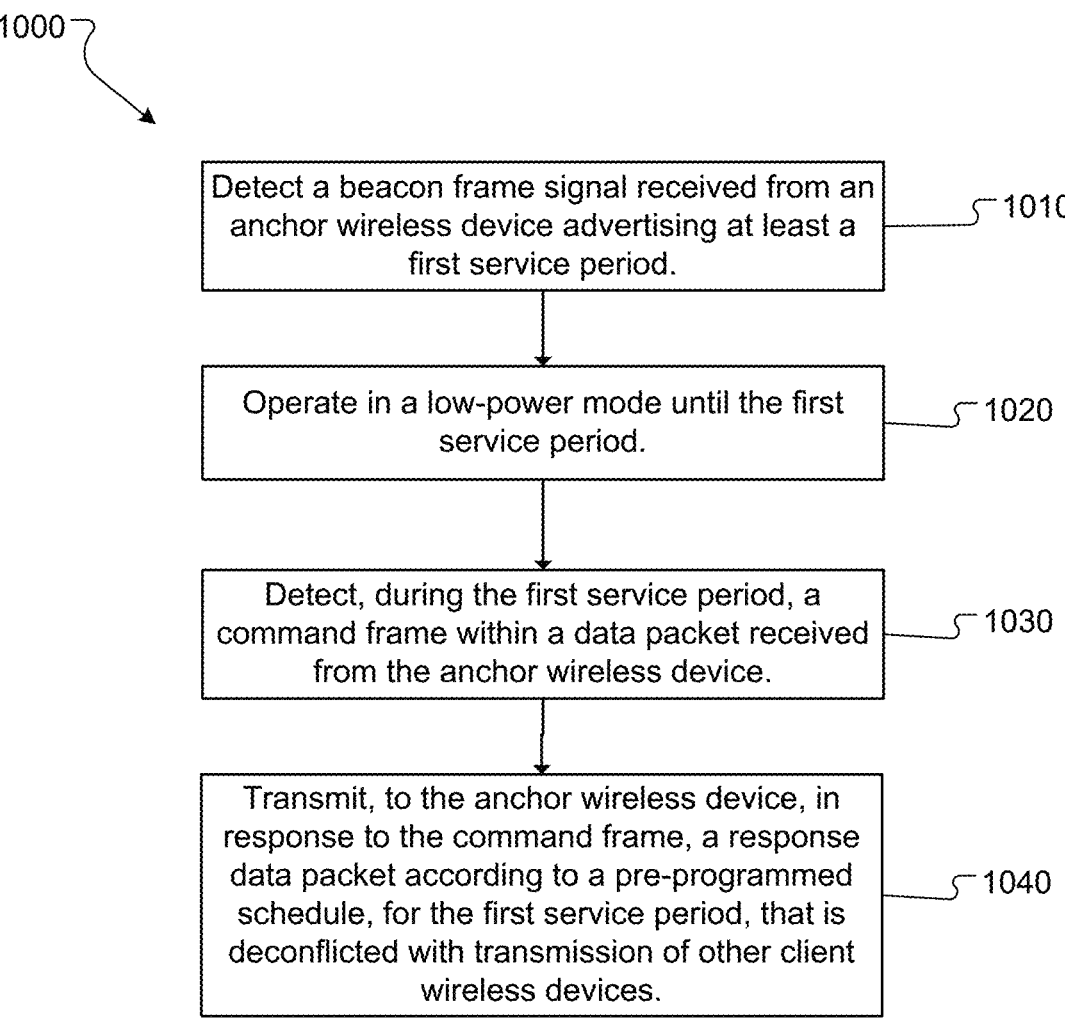

Detect a beacon frame signal received from an anchor wireless device advertising at least a first service period. — 1010

Operate in a low-power mode until the first service period. — 1020

Detect, during the first service period, a command frame within a data packet received from the anchor wireless device. — 1030

Transmit, to the anchor wireless device, in response to the command frame, a response data packet according to a pre-programmed schedule, for the first service period, that is deconflicted with transmission of other client wireless devices. — 1040

FIG. 10

MEDIUM ACCESS METHODS FOR AMBIENT POWER (AMP) DEVICES

CLAIM OF PRIORITY

The present application claims the benefit under 35 U.S.C. § 119(e) of U.S. Provisional Patent Application No. 63/512,840, filed Jul. 10, 2023, which is incorporated by this reference herein.

TECHNICAL FIELD

This disclosure relates to wireless devices and, more specifically, to medium access methods for ambient power (AMP) devices.

BACKGROUND

Radio frequency (RF) wireless devices have grown in type and capability. In some wireless local area networks (WLANs), anchor wireless devices such as routers and access points (APs) can be configured to track a location and optionally also a status of numerous client wireless devices that travel throughout a geographic area of the WLAN. Client wireless devices, such as wireless identification tags, are therefore duplicated throughout tracking systems. Some use cases include tagging containers of retail products traveling from and between warehouses and tagging luggage being transported from and between air transportation and within airports. Employing battery-powered identification tags for tracking can ensure reliable tracking by anchor wireless devices, particularly over large distances or that support significant data transmission, but are more expensive when duplicated for extensive tagging purposes. Employing ambient power (AMP) devices, which harvest energy from the environment, for tagging purposes is more cost effective, but may cause reliability issues due to operating with low and unpredictable amount of power. For example, AMP devices may have a difficult time communicating over a very large distance or transmitting very much data due to operating on low amounts of power.

BRIEF DESCRIPTION OF THE DRAWINGS

FIG. 2 is a flow diagram of a method of configuring the wireless network to communicate over different RF bands (or at least different frequencies within the same RF band) as between downlink and uplink transmissions, respectively, according to an embodiment.

FIG. 6A is a flow chart of a method for employing a security credential to authenticate an AMP device according to some embodiments.

FIG. 6B is a flow chart of a method for employing an encryption key to decrypt a data packet received from an AMP device according to some embodiments.

FIG. 6C is a flow chart of a method for employing a cryptographic hash function to verify the integrity of a data packet received from an AMP device according to some embodiments.

FIG. 9 is a flow chart of a method of anchor wireless device scheduling services periods during which to cause the AMP devices to communicate response data packets according to at least one embodiment.

FIG. 10 is a flow chart of a method of a client wireless (or AMP) device interacting with an anchor wireless device to be triggered to communicate response data packets according to a schedule set by the anchor wireless device according to some embodiments.

DETAILED DESCRIPTION

Figures 1A, 1B:
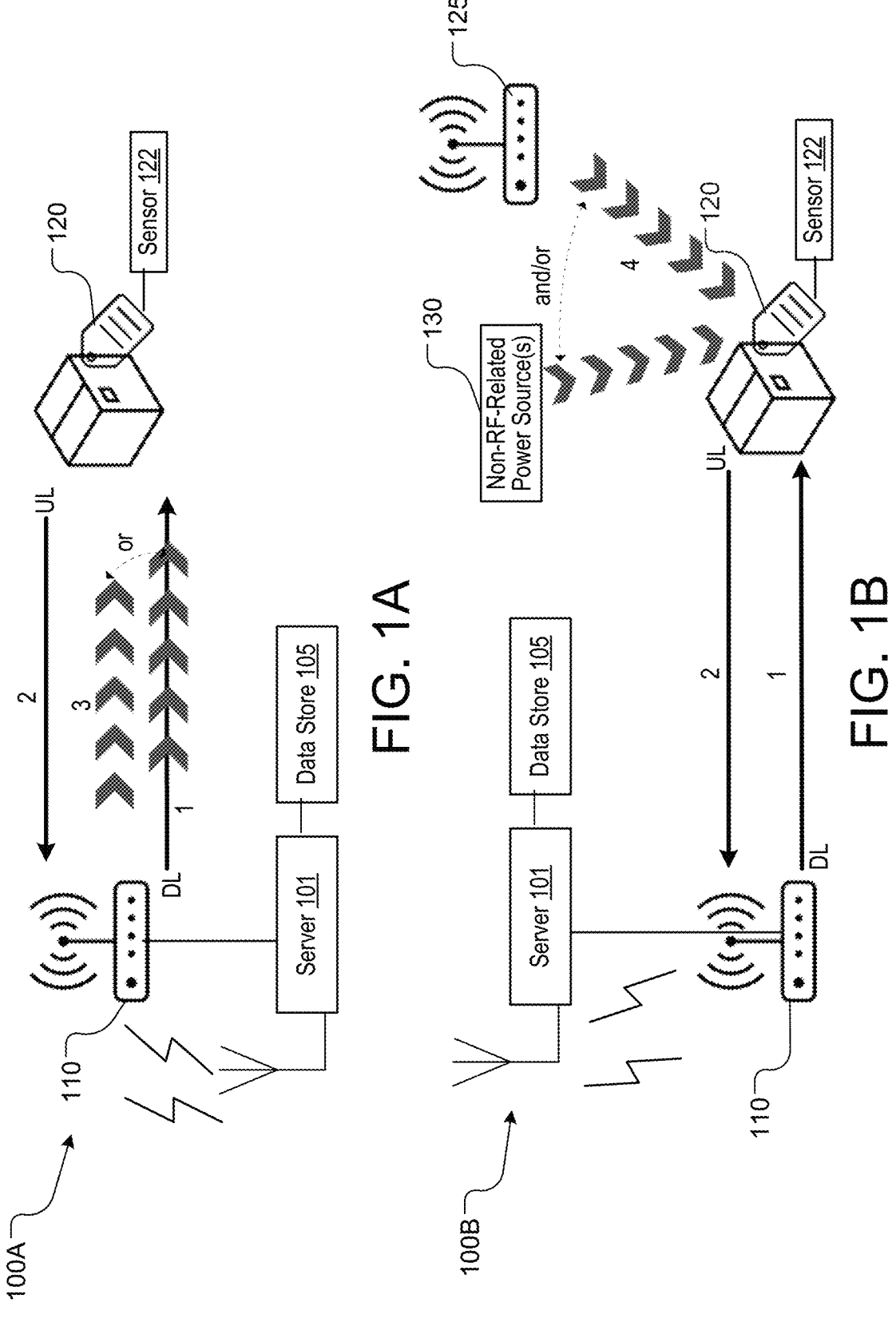
FIG. 1A is a block diagram of an exemplary wireless network configured with RF band arrangements for downlink and uplink transmissions between an anchor wireless device and an AMP device according to various embodiments.
FIG. 1B is a block diagram of an exemplary wireless network configured with RF band arrangements for downlink and uplink transmissions between an anchor wireless device and an AMP device according to other embodiments.

The following description sets forth numerous specific details such as examples of specific systems, devices, components, methods, and so forth, in order to provide a good understanding of various embodiments of radio frequency (RF) band arrangements for operation of ambient power (AMP) devices and of medium access methods for AMP devices. Some wireless devices AMP devices, e.g., AMP wireless clients, are simple wireless devices needing little processing and memory, and thus can operate with little power. These AMP devices harvest (or scavenge) energy out of the environment sufficient for brief and reduced processing. For example, AMP devices may communicate an identifier (ID) and/or other data being gathered by anchor wireless devices, such as routers and APs, from the AMP devices. Anchor wireless devices, which are stationary, may be so referenced within mesh networks because locations of anchor wireless devices are known, and thus are similarly referenced herein to be distinguished from mobile client wireless devices, such as AMP-based devices. In some cases, the known location is relative to a moving vehicle or the like, as some anchor wireless devices may have some level of mobility.

As discussed previously, employing AMP devices as mobile identifications tags (or similar AMP wireless clients) within a WLAN-based system is difficult due to having to operate the AMP devices at low power. Further, typical communication between an anchor wireless device and a mobile client wireless device (e.g., in the WLAN-based system) occurs over the same RF band and often at the same frequency, which is suboptimal in networked communication between downlink (DL) communication to the AMP devices and the uplink (UL) communication from the AMP devices. Further, typical communication in a WLAN between wireless clients and anchor wireless devices requires extensive handshake protocols to ensure authentication and verification of connected devices in addition to encryption of data exchanged between the wireless clients and anchor wireless devices. These more extensive protocol-based attachment methods are inconsistent with the low-power nature of the AMP devices due to the amount of power required. Despite these challenges, AMP devices may be desired due to the large number of client wireless devices needed in the WLAN system, e.g., for tagging and tracking numerous containers, crates, products, and the like, in addition to monitoring an environment of the AMP devices via associated sensors.

To resolve these and other deficiencies with known approaches to employing AMP devices in WLAN-based systems, according to disclosed embodiments, the present disclosure sets forth configuring and/or operating the anchor wireless devices and the AMP devices such that the AMP devices are energized for a limited purpose of triggering communication of limited data transmitted by the AMP devices to the anchor wireless devices. In some embodiments, the present disclosure provides various methods and systems in which the anchor wireless devices perform channel contention and scheduling of activation of the AMP devices for communication, reduced-power approaches for the AMP devices to identify themselves, perform network attachment, and a minimization of the amount of data or information that the AMP devices are to transmit on the channel. These and other medium access approaches that will be discuss facilitates conservation of as much power as possible by the disclosed AMP devices.

In some embodiments, for example, an anchor wireless device is configured to transmit a beacon frame signal to client wireless devices, which are AMP devices that harvest environmental energy. In some embodiments, the beacon frame signal advertises at least a first service period during which at least a subset of the client wireless devices are to transmit, e.g., an ID among other possible data back to the anchor wireless device. In some embodiments, the anchor wireless device transmits, during the first service period, a first wireless signal including a data packet with a command frame to activate the subset of client wireless devices into a transmission mode. In some embodiments, the command frame is a trigger frame, for example. The anchor wireless device may further receive, from the subset of client wireless devices in response to detecting the command frame, second wireless signals each including a response data packet. In some embodiments, the second wireless signals are received according to a pre-programmed schedule that deconflict transmissions by the subset of client wireless devices.

In related embodiments, for example, a client wireless device (e.g., an AMP device) detects a beacon frame signal received from an anchor wireless device advertising at least a first service period. In some embodiments, the client wireless device is one of many AMP devices that harvest environmental energy. The client wireless device may further operate in a low-power mode until the first service period and detect, during the first service period, a command frame received from the anchor wireless device that may trigger a response from the client wireless device. In some embodiments, the command frame is a trigger frame, for example. In some embodiments, the client wireless device transmits, to the anchor wireless device, in response to the trigger frame, a response data packet according to a pre-programmed schedule, for the first service period, that is deconflicted with transmission of other client wireless devices of the AMP devices.

The present disclosure further discusses several embodiments of arranging communication between the anchor wireless devices and the AMP devices (or AMP wireless client devices) in which the AMP devices are energized in multiple different ways, power consumption by the AMP devices is minimized, e.g., via minimizing channel contention requirements, and the RF bands are configured such that UL transmissions can differ in RF band (or at least in frequency) from DL transmissions. Additionally, an energizing band or signal may be the same or different compared to the RF bands used for UL and DL transmission.

In at least one embodiment, a wireless network includes an anchor wireless device to transmit, over a first radio frequency (RF) band, a first wireless signal including a data packet requesting information. A client wireless device may be configured to harvest energy from an environment of the client wireless device, receive the first wireless signal, and parse the data packet. In these embodiments, the client wireless device transmits, over a second RF band, a second wireless signal to the anchor wireless device, where the second wireless signal includes a data packet responding with the requested information. In some embodiments, the second RF band operates at a lower frequency range than that of the first RF band. In other embodiments, the first RF band is the same as the second RF band, but the DL transmission and the UL transmission are over different frequencies with significant separation within that RF band. In other embodiments, the second RF band operates at a high frequency range than that of the first RF band, which may provide a wider bandwidth and thus also have separate power consumption benefits.

The present disclosure includes a number of advantages, including the ability to minimize power consumption by AMP devices employed as wireless client devices within a WLAN-based system, providing many possible ways to energize the AMP devices, and different ways in which the DL and UL transmissions can be arranged to minimize RF band and/or frequency conflicts. Additional advantages will be apparent to those skilled in the art of WLAN-related tracking systems that employ AMP devices and are discussed further below.

FIG. 1A is a block diagram of an exemplary wireless network 100A configured with RF band arrangements for downlink (DL) and uplink (UL) transmissions between an anchor wireless device 110 and an AMP device 120, e.g., client wireless device, according to various embodiments. In some embodiments, the anchor wireless device 110 is an access point, a router, a wireless hub, a mobile hotspot device, or a wireless (or cellular) base station or the like that is stationary. In various embodiments, the AMP device 120 is a wireless identification tag, a low-power client wireless device, or AMP station (STA).

In some embodiments, the anchor wireless device 110 communicates to a WLAN server 101 to upload data to a cloud. In these embodiments, the WLAN server 101 includes or is coupled to a data store 105 of volatile or non-volatile memory, e.g., within cloud-based storage that exists in a local cloud or edge cloud or the like. In this way, data/information collected by the anchor wireless device 110 can be stored, by the WLAN server 101, in the data store 105 where the data can optionally be indexed against respective AMP devices 120, e.g., in a database or the like. In various embodiments, the data or information collected and stored includes an identification and/or a location of the AMP device 120, temperature data, humidity data, pressure data, level data (e.g., level of fluid or gas within a container), and/or other data associated with an environment of the AMP device 120. In some embodiments, the data or information is a log or array of information to include a data history of the AMP device 120 that includes environmental data or information collected over time. The sensor-related data may be detected from a sensor 122 (or multiple sensors) included within or coupled to the AMP device 120.

In many embodiments, there are one or more anchor wireless devices and many client wireless devices, which are AMP devices, as disclosed herein. Ambient power (AMP) devices are energized by harvesting energy from RF signals (e.g., RF-related power sources) and/or from non-RF-related power sources. In various embodiments, harvested energy from RF-related power sources are from in-band RF power sources (e.g., within the same RF band being used for DL/UL transmissions) or out-of-band RF power sources (e.g., DL and UL transmissions take place in different RF bands compared to RF band being used for energy harvesting). In additional embodiments, as will be illustrated with reference to FIG. 1B, non-RF-related power sources include solar or photovoltaic cells (convert ambient sunlight into electricity), thermoelectric generators (convert temperature gradients into electricity), vibration energy harvesting using piezoelectric, electrostatic, and electromagnetic converters (convert mechanical vibrations from the environment into electricity), miniature wind turbines (convert ambient wind energy into electrical power), pressure differential energy harvesting, dynamos or wearable harvesters (convert human or animal motion into electrical energy), and other such energy-harvesting mechanisms.

With additional reference to FIG. 1A, in at least one embodiment, the anchor wireless device 110 transmits a first wireless signal (1), which is a DL transmission, over a first RF band to the AMP device 120. In some embodiments, the first wireless signal includes a data packet requesting information from the AMP device 120. The AMP device 110 may receive the first wireless signal and parse the data packet to determine the requested information.

In these embodiments, the AMP device 120 transmits a second wireless signal (2), which is a UL transmission, over a second RF band to the anchor wireless device 110 with a data packet with the requested information. In this way, the requested information or data (discussed previously) may be requested and received from the AMP device 120 through data packet exchange. In various embodiments, the anchor wireless device 110 generates the first wireless signal employing technology such as Wi-Fi®, Bluetooth®, Bluetooth® Low Energy, Ultra-Wideband (UWB), Z-Wave™, Zigbee®, LoRa™, Wi-SUN®, or other wireless protocol. In various embodiments, the AMP device 120 generates the second wireless signal employing technology such as Wi- Fi®, Bluetooth®, Bluetooth® Low Energy, Ultra-Wideband (UWB), Z-Wave™, Zigbee®, LoRa™, Wi-SUN®, or other wireless protocol.

In some embodiments, the first RF band for DL transmission differs from the second RF band used for UL transmission. In some embodiments, the second RF band operates at a lower frequency range than that of the first RF band, e.g., as low frequencies consume less power. Lower frequencies also exhibit smaller path losses compared to higher frequencies and, at the same power, the wireless signals can be adequately received and decoded at a farther distance and propagate through or around obstacles better compared to higher frequencies. Further, RF and circuit design at lower frequencies can be far less complex compared to being designed for at higher frequency operation, keeping costs low for the AMP devices.

In some embodiments, the second RF band operates at a higher frequency range than that of the first RF band, e.g., higher frequency operations deploy wider channel bandwidths, which in turn allow a transmission of the same number of user bytes and finish earlier. The AMP device 120 may then receive and/or transmit for a shorter period of time, conserving power and providing a separate power consumption benefit. Accordingly, use of a higher frequency range or a lower frequency range with the UL transmission (compared to the DL transmission) may involve a cost benefits analyze that weighs these benefits as between higher or lower frequency ranges.

In other embodiments, the first RF band is the same as the second RF band, but the DL transmission and the UL transmission occur over different frequencies with significant separation (e.g., more than a few 100 megahertz (MHZ) within that same RF band. In these ways, both the technology and RF bands (or frequencies) can differ as between the DL/UL transmissions so that AMP devices can operate at lower power while avoiding frequency conflicts between the DL and UL transmissions.

In various embodiments, the first wireless signal (1), e.g., transmitted in the first RF band, is also an energizing RF signal, illustrated with thick directional indicators, from which the AMP device 120 harvests energy. In similar embodiments, the anchor wireless device 110 instead transmits a separate energizing RF signal (3) towards the AMP device 120, but this separate energizing RF signal (3) is also within the first RF band, e.g., is not necessarily the same as the first wireless signal (1), but may be close in frequency. In alternative embodiments, the separate energizing RF signal (3) is transmitted over the second RF band, e.g., of the UL transmission, or is transmitted over an entirely different third RF band. Accordingly, in differing embodiments, the energizing RF signal (3) is sent over the first RF band, the second RF band, or the third RF band. For example, in some embodiments by way of example, the first RF band is 5.0 gigahertz (GHz), the second RF band may be 2.4 GHZ, and the third RF band may be 5.0 or 6.0 GHZ, where the third RF band may also be employed by the anchor wireless device 110 to communicate with other mobile stations (STA).

FIG. 1B is a block diagram of an exemplary wireless network 100B configured with RF band arrangements for DL and UL transmissions between the anchor wireless device 110 and the AMP device 120 according to other embodiments. In some embodiments, the anchor wireless device 110 does not transmit the energizing RF signal. For example, in other embodiments, the wireless network 100B further includes a second anchor wireless device 125 and/or non-RF-related power sources 130 that provide RF power and/or non-RF power, respectively, from which the AMP device 120 harvests energy (e.g., from power sources other than from the anchor wireless device 110 associated with the DL/UL transmissions). Possible non-RF-related power sources were previously discussed. In some embodiments, the second anchor wireless device is a cellular base station operating in licensed or shared frequency bands.

At operation 210, the processing logic transmits, over a first RF band, a first wireless signal to a client wireless device. In some embodiments, the client wireless device is an ambient power (AMP) device that harvests environmental energy. In some embodiments, the first wireless signal includes a data packet requesting information from the client wireless device.

TABLE 1

| Energizing AMP STAs (Signal 3 or 4) | DL Transmissions (Signal 1) | UL Transmissions (Signal 2) | Notes: |
|---|---|---|---|
| Band X (e.g., 900 MHz) | Band X (e.g., 900 MHz) | Band X (e.g. 900 MHz) | RF band for energy harvesting same as the RF band used for DL/UL |
| Band X (e.g. 900 MHz) | Band Y (e.g. 2.4 GHz) | Band Y (e.g. 2.4 GHz) | RF band for energy harvesting different from RF band used for DL/UL |
| Band X (e.g. 900 MHz) | Band X (e.g. 5 GHz) | Band Y (e.g. 900 MHz) | DL/UL on different bands; RF band for energizing is same as RF band for DL |
| Band X (e.g. 2.4 GHz) | Band Y (e.g. 6 GHz) | Band X (e.g. 2.4 GHz) | DL/UL on different bands; RF band for energizing is same as RF band for UL |
| Band X (e.g. 2.4 GHz) | Band Y (e.g. 5 GHz) | Band Z (e.g. 900 MHz) | All 3 bands are different |

In at least some embodiments, the second anchor wireless device 125 transmits an energizing RF signal (4) towards the client wireless device from which the client wireless device harvests energy. In various embodiments, the energizing RF signal (4) is transmitted over one of the first RF band, the second RF band, or a third RF band. In some embodiments, the energizing RF signal (4) is transmitted as a continuous wave (CW) or using technology including Bluetooth®, Bluetooth® Low Energy, or Zigbee®. In further embodiments, the energizing signals (1) or (3) discussed with reference to FIG. 1A are combined with the energizing RF signal (4) of FIG. 1B. Further, non-RF-related energy harvesting may be employed alone or in combination with RF-related energy harvesting. Table 1 summarizes the different combinations of RF bands for DL/UL transmissions and energizing RF signals associated with the embodiments explained above with reference to FIGS. 1A-1B. The example frequencies provided after the respective RF bands are by way of example only and are not meant to be limiting, as the different frequencies can vary widely and may depend on different technology and protocols now in existence or yet to be developed. For example, in addition to 900 MHZ, 2.4 GHZ, 5 GHZ, and 6 GHZ, millimeter wireless also operates in the 57-71 GHz range and any of the RF bands listed in Table 1 could also be within the millimeter wireless range of operation.

FIG. 2 is a flow diagram of a method 200 of configuring the wireless network to communicate over different RF bands (or at least different frequencies within the same RF band) as between downlink and uplink transmissions, respectively, according to an embodiment. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the anchor wireless device 110, e.g., processing logic of the anchor wireless device 110 in connection with anchor device hardware (see FIG. 3).

At operation 220, the processing logic receives, over a second RF band, a second wireless signal from the client wireless device. In some embodiments, the second wireless signal includes a data packet responding with the requested information. In various embodiments, the requested information includes an identification of the client wireless device, security credentials, a location of the client wireless device, temperature data, humidity data, pressure data, and/or environmental-related data associated with the environment of the client wireless device.

Figure 3:
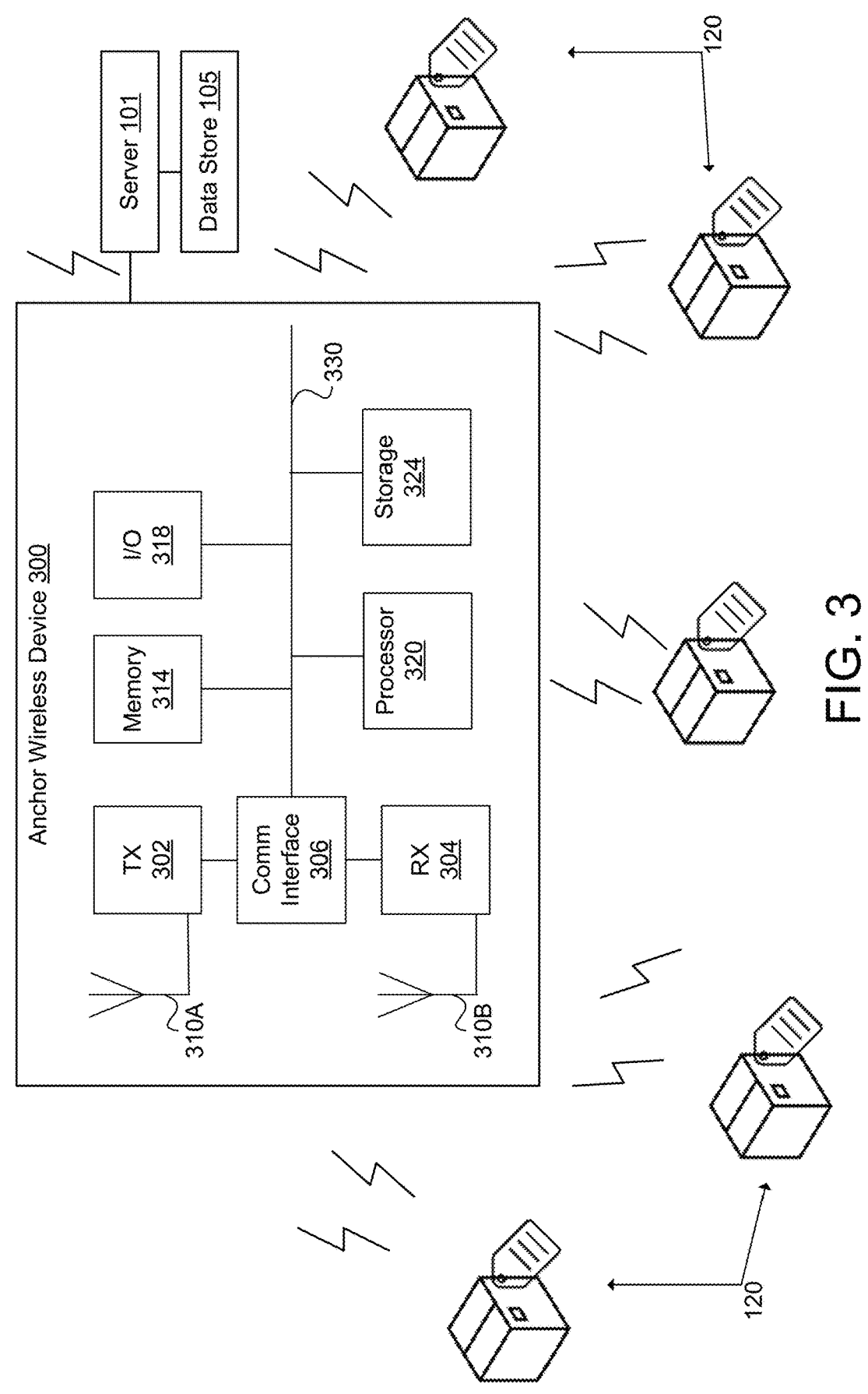
FIG. 3 is a simplified block diagram of an exemplary anchor wireless device according to at least one embodiment.

FIG. 3 is a simplified block diagram of an exemplary anchor wireless device 300 according to at least one embodiment. In some embodiments, the anchor wireless device 300 is the anchor wireless device 110 of FIGS. 1A-1B and FIG. 2. In at least some embodiments, the anchor wireless device 300 includes, but is not be limited to, a transceiver that includes a transmitter 302 or TX (e.g., a WLAN transmitter) and a receiver 304 or RX (e.g., a WLAN receiver). In some embodiments, the anchor wireless device 300 further includes a communications interface 306 coupled to the transmitter 302 and the receiver 304 (e.g., of the transceiver), a TX antenna 310A coupled to the transmitter 302, an RX antenna 310B coupled to the receiver 304, a memory 314, one or more input/output (I/O) devices 318 (such as a display screen, a touch screen, a keypad, and the like), a processor 320, and a storage device 324. These components can all be coupled to a communications bus 330. In some embodiments, aspects of the communication interface 306 work with the processor 320 to perform operations or that function as a processing device of the anchor wireless device 300. In some embodiments, there is a single antenna and multiplexing logic to switch use of the antenna between the TX and RX.

In at least some embodiments, the storage device 324 is non-volatile memory that stores instructions (such as software or firmware code) executable by the processor 320 and/or data generated by the communication interface 306. In some embodiments, the memory 314 is volatile memory (e.g., system memory) that supports the execution, by the processor, of subsets of the instructions and can also buffer data generated by the communication interface 306. In various embodiments, frontend components such as the transmitter 302, the receiver 304, the communication interface 306, and one or more antennas are adapted with or configured for WLAN and WLAN-based frequency bands, e.g., Wi-Fi®, Bluetooth® (BT), Bluetooth® Low Energy (LBE), Ultra-Wideband (UWB), Z-Wave™, Zigbee®, LoRa™, Wi-SUN®, or other wireless protocol. While some of the protocols may also be referred to as personal area network (PAN) technology, for simplicity, all are broadly referred to as WLAN technology. Future protocols are also envisioned.

In various embodiments, the communications interface 306 is integrated with the transmitter 302 and the receiver 304, e.g., as a frontend of the wireless device 301. The communication interface 306 may coordinate, as directed by the processor 320, to request/receive packets from other wireless devices or those that reflect off of objects. The communications interface 306 can further process data symbols received by the receiver 304 in a way that the processor 320 can perform further processing, including identifying and parsing data packets received within the wireless signals.

With additional reference to FIGS. 1A-1B, in several use case embodiments, e.g., logistics and transportation, inventory management, warehouses, and luggage, the AMP devices 120 are assumed to have extremely limited energy storage capabilities, e.g., an AMP tag form factor that disallows large capacitors for storing energy and/or charge. Based on these limitations, the present disclosure discusses ways to simplify channel access (or medium access) for these types of limited-capable AMP devices 120. In various embodiments, simplifying medium access includes simplifying the network attach procedure, simplifying the channel contention requirements for the AMP devices (e.g., would prefer ID tags are sleeping most of the time, thus not listening), and minimizing what data the AMP devices 120 need to transmit.

To facilitate these low basic levels of AMP device functionality, according to some embodiments, the anchor wireless devices 110 are configured to do as much of the processing as possible, e.g., in what can be termed as asymmetric protocol design. The protocol may be designed, for example, such that the anchor wireless devices 110 perform the following functions in order to minimize the required transceiver "ON time" of the AMP devices 120.

In some embodiments, the anchor wireless devices 110 significantly reduce the listening burden of the AMP devices 120 to detect the network medium as busy, e.g., known as clear channel assessment (CCA). In some embodiments, the anchor wireless devices 110 minimize the receive processing burden of the AMP devices, e.g., by performing the channel reservations, for example. In this way, once energized, the AMP devices 120 just start transmitting or transmit based on some trigger that takes little power. In some embodiments, the anchor wireless devices 110 minimize the necessity to transmit, e.g., and thus proxy communication for the AMP devices 120 wherever and whenever possible. If a transmission needs to occur, the anchor wireless devices 110 can minimize what gets transmitted. Further, there is no need for each transmission to be understood by legacy STAs, e.g., meaning that a legacy part of the preamble can be omitted (see FIG. 5).

In regular (or legacy) STAs, which are generally powered at higher levels and may include batteries, association and network entry or attachment is carried out using a prescribed sequence of frame exchanges over the air. As just one example, Wi-Fi® IEEE 802.11 security protocol can be considered as starting with a probe request from wireless clients followed by a probe response from an anchor device (e.g., AP). This is followed by an authentication request from the wireless device followed by a system authentication response from the anchor device, and an association request (with security parameters) from the wireless device followed by an association response from the anchor device. If any of the authentication request or association request fails, the 802.11X-controlled port on the anchor device may be blocked.

In at least some embodiments, to reduce the need for such message exchanges, the AMP devices 120 (e.g., wireless ID tags) are pre-authenticated and pre-associated. For example, in some embodiments, the server 101 generates a security credential when an AMP device 120 is activated for use within the WLAN, e.g., the wireless network 100A or 100B. This security credential can be a data secret, an encrypted ID, an encrypted medium access control (MAC) address, or the like in different embodiments, which may be generated by public and/or private keys. In some embodiments, the server 101 stores the security credential in the data store 105 for later access when performing streamlined authentication of the AMP device 120. The server 101, or a tag activation device coupled with the server 101 or separately employed during AMP device manufacturing, may also store the security credential in memory of the AMP device 120 (see FIG. 14). In this way, when the AMP device 120 transmits the response data packet containing its ID and potentially other data, the AMP device 120 can also send the security credential, e.g., appended to or located within the response data packet (see FIG. 4). In some embodiments, the entire packet that contains the appended security credential is encrypted. The anchor wireless device 110 may then authenticate the AMP device 120 based on the security credential retrieved from the data store 105 matching the security credential received from the AMP device 120 (see FIG. 6A).

In some embodiments, the anchor wireless device 110 may also calculate a message integrity code (MIC) by applying a cryptographic hash function to the response data packet and comparing the MIC to another MIC appended, by the AMP device 120, to the response data packet by the AMP device 120. The MIC may be employed to prevent message tampering or replay attacks (see FIG. 6C).

With additional reference to FIG. 3, in some embodiments, the anchor wireless device 300 includes a transceiver (e.g., the transmitter 302 and the receiver 304) to wirelessly communicate with a plurality of AMP devices 120 that harvest environmental energy. In some embodiments, the anchor wireless device 300 further includes the communication interface 306 coupled to the transceiver and the processor 320 coupled to the communication interface 306.

In some embodiments, the processor 320 causes the communication interface 306 and the transceiver to transmit a beacon frame signal (or other similar broadcast control message) to the plurality of AMP devices 120 as well as to any regular STAs or wireless devices. In some embodiments, the beacon frame signal (or other similar broadcast control message) advertises at least a first service period during which at least a plurality of AMP devices 120 are to transmit. In some embodiments, the processor 320 further causes the communication interface 306 and the transceiver to transmit, during the first service period, a first wireless signal including a data packet with a command frame to activate a subset of the plurality of AMP devices into a transmission mode (see FIGS. 11-13). In some embodiments, the command frame is a trigger frame (TF) or a polling frame or the like.

Figures 4, 5:
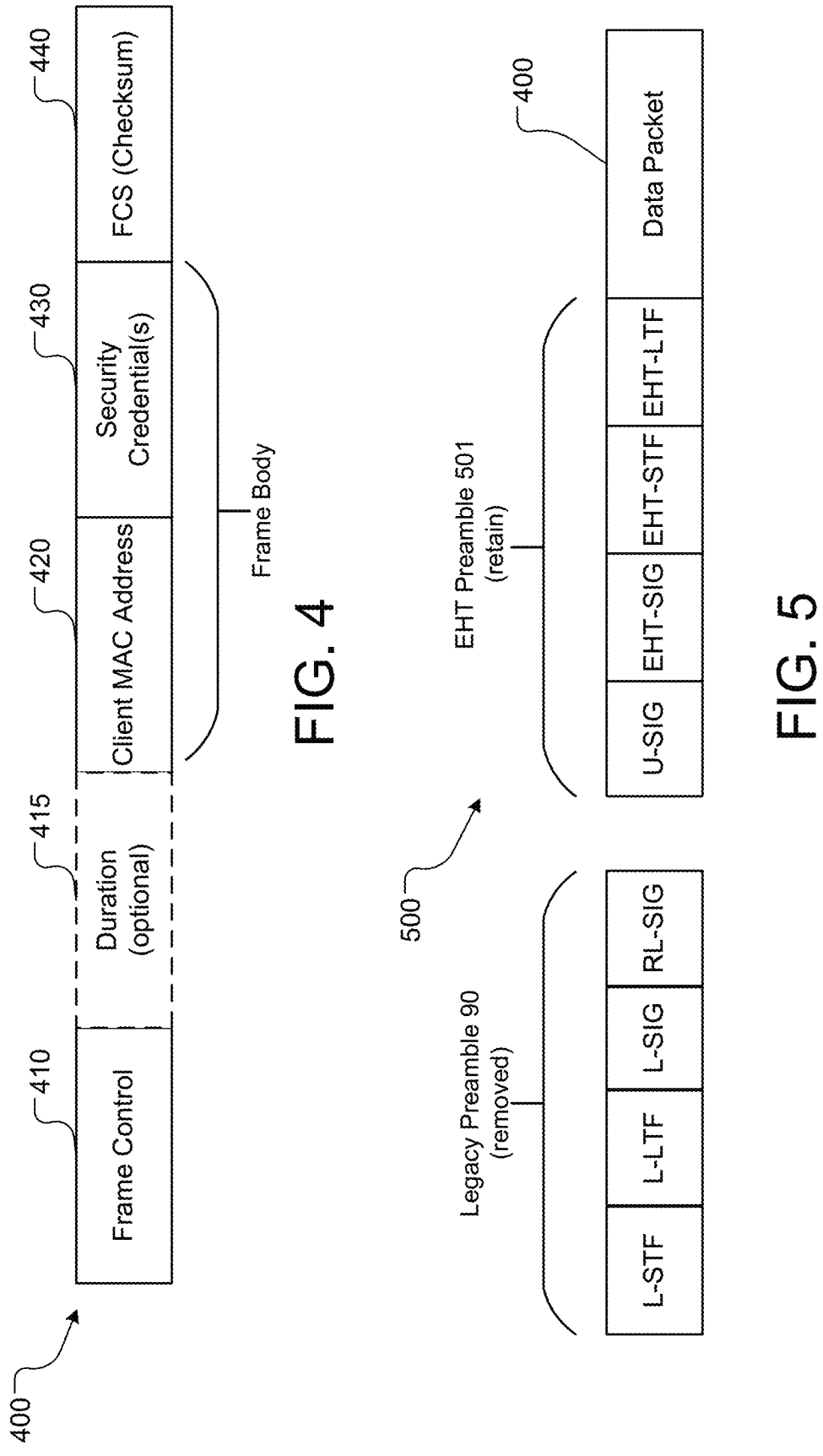
FIG. 4 is a block diagram of a response data packet according to an embodiment.
FIG. 5 is a block diagram of the response data packet of FIG. 4 along with a new preamble according to some embodiments.

In some embodiments, the processor 320 causes the communication interface 306 and the transceiver to receive, from the subset of AMP devices in response to detecting the command frame, second wireless signals each including a response data packet (see FIG. 4). In some embodiments, the second wireless signals are received according to a pre-programmed schedule that deconflict transmissions by the subset of AMP devices 120. The contention-based reservation functionality of the anchor wireless device 300 will be discussed in more detail with reference to FIGS. 7-8.

In at least some embodiments, the processor 320 also retrieves, from each response data packet received from the subset of client wireless devices, an identification of a respective client wireless device (e.g., AMP device 120). In some embodiments, the processor 320 also retrieves, from a clock source, at least a day and time of reception of each response data packet. The processor 320 may also store, in a cloud-based data store (such as the data store 105), the identification, day and time, and a location in association with each respective client wireless device of the subset of client wireless devices. In this way, the anchor wireless devices leverages the server 101 and data store 105 to aggregate and track various data associated with the AMP devices 102.

FIG. 4 is a block diagram of a response data packet 400 according to an embodiment. By reducing the size of the response data packet 400 that is transmitted by the AMP devices 120, AMP device power consumption is reduced in terms of how much energy is required to transmit the response data packet 400. According to at least one embodiment, therefore, the response data packet 400 is formatted as an AMP acknowledgement frame with only the fields needed to communicate a limited amount of information to the anchor wireless device 110 or 300. In some embodiments, the fields include a frame control field 410, an optional duration field 415, the MAC address 420 of the AMP device, one or more security credentials fields 430, and a checksum field 440, e.g., a frame sequence check (FCS) field including a parity value with which to check the correctness of the data in the frame body. Security credentials were discussed previously. In some embodiments, the MAC address uniquely identifies a respective client wireless device, e.g., the AMP device 120. In some embodiments, the duration field 415 is optional as the value of the duration field 415 is typically employed for channel reservation, but the anchor wireless device 110 or 300 can generally perform the channel reservation instead, as will be discussed in more detail. Thus, in some embodiments, the duration field 415 is excluded if the response duration and the transmission parameters are known in advance, e.g., according to a modulation and coding scheme, as this may result in a-priori known fixed packet size.

In some embodiments, a security credential is appended to the response data packet 400 rather than being included as a regular part of the frame body (e.g., in the security credentials field 430), thus keeping the response data packet 400 as short as possible and of known length. In such embodiments, the location of the security credentials may be known to follow at the end of the response data packet 400 and self-identify in length, e.g., for ease of access.

In disclosed embodiments, by minimizing the size of the response data packet 400, each AMP device 120 can easily (and without consuming much power) securely communicate its MAC address to the anchor wireless device 110 or 300. The MAC address itself communicates that the particular AMP device 120 is present and thus also its general location, e.g., at a particular warehouse (or portion of the warehouse), at a particular airport (or luggage carousel of the airport), and the like.

FIG. 5 is a block diagram of the response data packet 400 of FIG. 4 along with a new preamble 501 according to some embodiments. As illustrated, in some embodiments, a legacy preamble 90 is used in updated wireless protocols (such as Wi-Fi® 7, also known as IEEE 802.11be™) for purposes of backwards compatibility with previous standards. Although the Extremely High Throughput (EHT) legacy preamble of IEEE 802.11be™ is illustrated, this is only by way of example. The legacy preamble 90 may also be the Ultra-High Reliability (UHR) preamble of IEEE 802.11bn™, where applicable.

In at least some embodiments, the legacy preamble 90 is excluded or removed and just the new preamble 501 is added to a front of the response data packet 400. Accordingly, the response data packet 400 may be transmitted without the legacy preamble, but with the new preamble 501. In some embodiments, the new preamble 501 is the enhanced throughput (EHT) preamble of IEEE 802.11be™, which includes a U-SIG field, an EHT-SIG field, an EHT-STF field, and an EHT-LTF field, where STF stands for short training field, LTF stands for long training field, and SIG stands for signal field. In some embodiments, the STF helps the receiver 304 of the anchor wireless device 300 achieve time synchronization with the transmitter of the AMP device 120, the LTF is used for fine synchronization, channel estimation, and deriving other parameters used for demodulation, and SIG conveys important information about the upcoming transmission, such as its rate, length, and other modulation-specific parameters.

FIG. 6A is a flow chart of a method 600A for employing a security credential to authenticate an AMP device according to some embodiments. The method 600A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600A is performed by the anchor wireless device 110, e.g., processing logic of the anchor wireless device 110 in connection with anchor device hardware (see FIG. 3). In some embodiments, the AMP device 120 (e.g., first client wireless device) generates a first security credential that is sent with the response data packet (e.g., in the security credentials field 430) to the anchor wireless device 110.

At operation 610, the processing logic receives the first security credential appended to or located within the response data packet received from the first client wireless device of the subset of client wireless devices.

At operation 615, the processing logic retrieves, from the data store 105, a second security credential that was pre-associated and pre-stored as belonging to the first client wireless device.

At operation 620, the processing logic authenticates the first client wireless device based on the first security credential matching the second security credential.

FIG. 6B is a flow chart of a method 600B for employing an encryption key to decrypt a data packet received from an AMP device according to some embodiments. The method 600B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 600B is performed by the anchor wireless device 110, e.g., processing logic of the anchor wireless device 110 in connection with anchor device hardware (see FIG. 3). In some embodiments, the AMP device 120 (e.g., first client wireless device) encrypts, using a stored encryption key, a first response data packet before transmitting the encrypted response data packet to the anchor wireless device.

At operation 630, the processing logic retrieves, from a data store, an encryption key associated the first client wireless device of the subset of client wireless devices.

At operation 640, the processing logic decrypts, using the encryption key, the encrypted first response data packet received from the first client wireless device.

FIG. 6C is a flow chart of a method 600C for employing a cryptographic hash function to verify the integrity of a data packet received from an AMP device according to some embodiments. The method 600C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600C is performed by the anchor wireless device 110, e.g., processing logic of the anchor wireless device 110 in connection with anchor device hardware (see FIG. 3). In some embodiments, the AMP device 120 (e.g., first client wireless device) applies a stored cryptographic hash function to a first response data packet to generate a first message integrity code (MIC). The AMP device 120 may then append the first MIC to the first response data packet before transmitting the first response data packet to the anchor wireless device 110.

At operation 650, the processing logic retrieves, from the data store 105, a cryptographic hash function associated with a first client wireless device of the subset of client wireless devices.

At operation 660, the processing logic generates a second message integrity code (MIC) by applying the cryptographic hash function to the first response data packet received from the first client wireless device.

At operation 670, the processing logic verifies an integrity of the response data packet by comparing the second MIC to a first MIC appended to the first response data packet. By verifying the integrity of the first response data packet, the anchor wireless device 110 can ensure that the first response data packet has not been intercepted and modified by an attacker. These MICs can be employed in security protocols such as WPA2-PSK and WPA-2 Enterprise (among others) to protect against attaches such as message tampering and replay attacks.

Figures 7, 8:
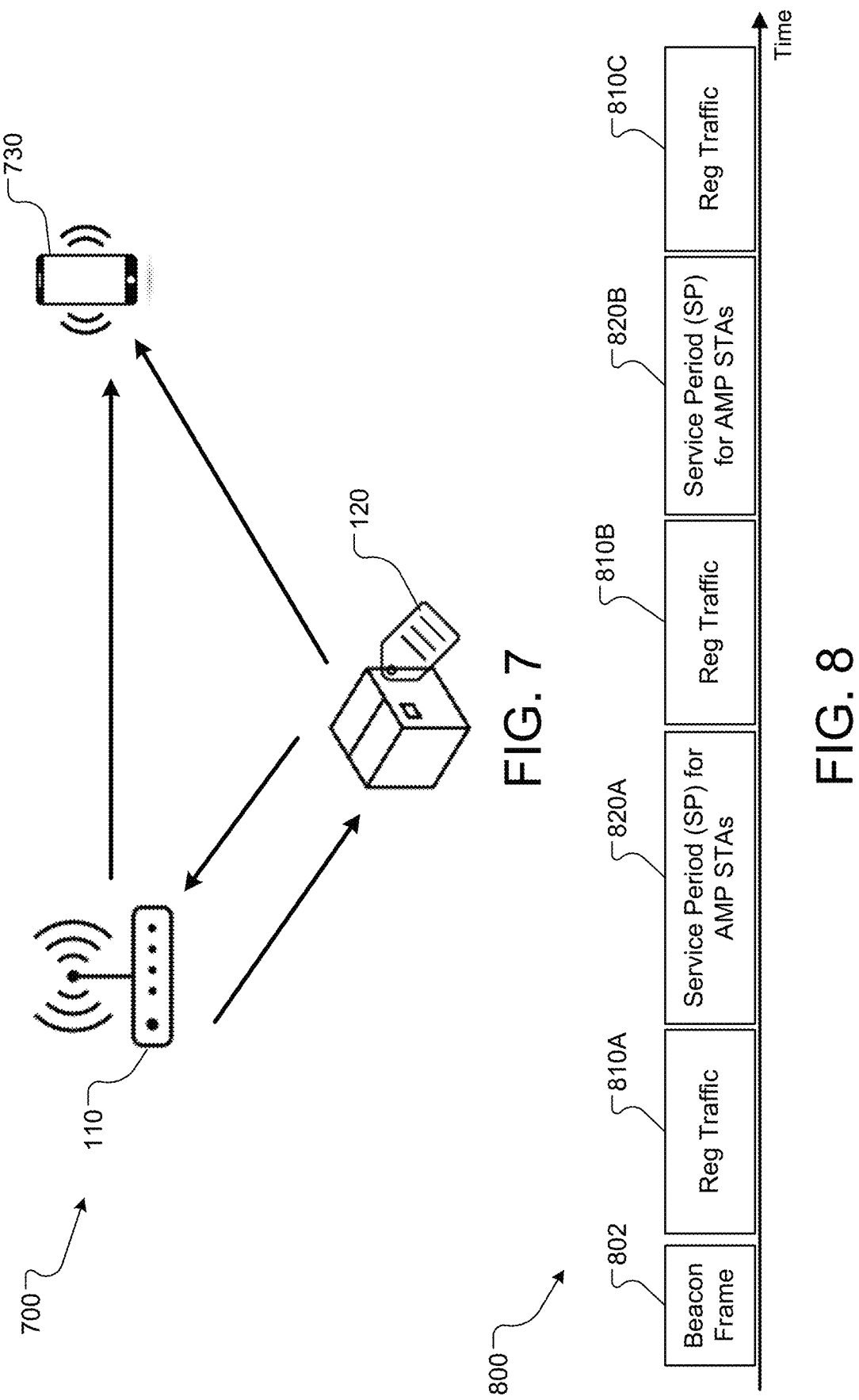
FIG. 7 is a block diagram of an exemplary wireless network in which the anchor wireless device performs channel reservation and contention on behalf of the AMP devices according to at least one an embodiment.
FIG. 8 is a timing diagram of a medium reservation sequence that includes intervening service periods (SPs), which the anchor wireless device reserves and during which AMP devices communicate data according to some embodiments.

FIG. 7 is a block diagram of an exemplary wireless network 700 in which the anchor wireless device 110 performs channel reservation and contention on behalf of the AMP devices according to at least one embodiment. In at least some embodiments, the anchor wireless device 110 performs channel reservation and contention to support transmission, by the client wireless devices, during the service periods, that is compliant with WLAN-based medium reservation protocols and understood by different station (STA) device types. In some embodiments, the wireless network 700 includes one or more regular wireless devices 730 (e.g., legacy STAs) that are looking to connect to the anchor wireless device 110 according to medium reservation performed by the anchor wireless device 110. For example, the channel reservation may be performed in a manner that every STA in a current network (or Basic Service Set (BSS)) and possibly also in networks of a neighboring anchor wireless device (OBSSs) can recognize that the anchor wireless device 110 is reserving the medium for the AMP devices 120 (see FIG. 8).

In at least some embodiments, the format of the response data packets 400 (without the legacy preamble 90, see FIG. 5) sent by the AMP devices 120 need not be understood or decodable by regular wireless devices 730 participating in the regular network traffic, so the fact that the response data packets do not have the legacy preamble is unimportant. This is due at least to the scheduling performed by anchor wireless devices 110 and the broadcasting of that schedule to all networked STAs so that the regular wireless devices 730 can, in some embodiments, ignore traffic during the service periods.

In other embodiments, the regular wireless devices 730 are configured to detect the response data packets 400 transmitted by the AMP devices 120, e.g., be programmed with an ability to detect the new preamble 501 (see FIG. 5). In some embodiments, the regular wireless devices 730 are capable of forwarding the detected response data packets to the anchor wireless device 110 in situations where the AMP devices 120 have insufficient power to do so. In these later embodiments, the regular wireless devices 730 need not decode the response data packets 400, but recognize that the response data packets 400 are intended for the anchor wireless device 110 and forward them accordingly.

FIG. 8 is a timing diagram of a medium reservation sequence 800 that includes intervening service periods (SPs), which the anchor wireless device 110 reserves and during which AMP devices 120 communicate data according to some embodiments. In some embodiments, the anchor wireless device 110 performs medium access reservation work on behalf of the AMP devices 120 so that the AMP devices 120 can transmit just enough information for the anchor wireless device 110 to understand and use the information. In at least some embodiments, the medium reservation begins with the anchor wireless device 110 transmitting a beacon frame signal 802 (or other similar broadcast control message) to the client wireless devices (e.g., AMP devices 120) as well as to the regular wireless devices 730 (e.g., regular or legacy STAs). In embodiments, the beacon frame signal 802 advertises at least a first service period (SP), as well as any additional service periods that have been scheduled. More specifically, the beacon frame signal 802 may include the start time of each SP, the duration of each SP, and the periodicity (or service interval) of the service periods (SPs). In this way, the anchor wireless device 110 may reserve multiple SPs for a duration of time.

In at least some embodiments, the AMP devices 120 are made up of two types. A first type of AMP device may include those that, a-priori, are known to be present during specific SPs and that do not respond to a command frame. These SP-specific AMP devices, for example, may have specific periodicities of data generation in the vicinity of the anchor wireless device 110, and the anchor wireless device 110 may need only receive and store this data. A second type of AMP device may include AMP devices 120 with which the anchor wireless device 110 will decide to communicate just before a specific SP and will trigger such communication via use of a data packet having a command frame. The anchor wireless device 100, therefore, would need at least a MAC or other ID of the second types of AMP devices to put into the command frame to initiate communication with those AMP devices 120. In some embodiments, the anchor wireless device 110 communicates with a combination of these first and second types of AMP devices 120 during any given service period (SP).

In various embodiments, during each service period, at least a subset of client wireless devices are scheduled to transmit their response data packets 400, e.g., over second wireless signals. As illustrated, only by way of example, there is scheduled a first service period 820A and a second service period 820B, along with regular traffic periods 810A, 810B, and 810C scheduled between the service periods. In at least some embodiments, the anchor wireless device 110 detects a cessation in receiving the second wireless signals from client wireless devices and transmits a contention-free (CF) end frame to free up a transmission channel for regular network traffic during a remainder of any given service period.

In some embodiments, the anchor wireless device 110 determines an interval time between and a duration of each service period of multiple service periods, including the first service period. In some embodiments, this determination is based on a density of the client wireless devices (e.g., AMP devices 120) and application demands for regular network traffic. For example, the demands for regular network traffic may be relatively small in a warehouse and so less regular network traffic need be scheduled while demand may be relatively large in an airport where more regular network traffic would be scheduled. In areas of higher regular network traffic, additional anchor wireless devices 110 may be deployed to handle an expected density of AMP devices 120. By proper infrastructure planning and reservation handling, the anchor wireless devices 110 in a WLAN-based system are able to interact with as many AMP devices 120 as necessary to gather the ID and information/data from the AMP devices 120.

FIG. 9 is a flow chart of a method 900 of anchor wireless device scheduling services periods during which to cause the AMP devices to communicate response data packets according to at least one embodiment. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the anchor wireless device 110, e.g., processing logic of the anchor wireless device 110 in connection with anchor device hardware (see FIG. 3).

At operation 910, the processing logic causes the anchor wireless device 110 to transmit a beacon frame signal to multiple client wireless devices, which are ambient power (AMP) devices that harvest environmental energy. In some embodiments, the beacon frame signal advertises at least a first service period during which at least a subset of client wireless devices, of the plurality of client wireless devices, are to transmit response data packets.

At operation 920, the processing logic causes the anchor wireless device 100 to transmit, during the first service period, a first wireless signal including a data packet with a command frame to activate the subset of client wireless devices into a transmission mode.

At operation 930, the processing logic causes the anchor wireless device 110 to receive, from the subset of client wireless devices in response to detecting the command frame, second wireless signals each including a response data packet. In some embodiments, the second wireless signals are received according to a pre-programmed schedule that deconflict transmissions by the subset of client wireless devices (see FIGS. 11-13).

In some embodiments dealing with a plurality of client wireless devices, operations 920 and 930 further include the processing logic causing the anchor wireless device 110 to automatically communicate with a first type of client wireless device having a known presence during the first service period and that does not respond to the command frame. In such embodiments, the processing logic also cause the anchor wireless device to communicate with, during the first service period, a second type of client wireless device identified by the anchor wireless device just before the first service period and that is activated by the command frame into the transmission mode.

FIG. 10 is a flow chart of a method 1000 of a client wireless (or AMP) device interacting with an anchor wireless device to be triggered to communicate response data packets according to a schedule set by the anchor wireless device according to some embodiments. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by a client wireless device such as the AMP device 120, e.g., processing logic of the AMP device 120 in connection with client device hardware (see FIG. 14).

At operation 1010, the processing logic detects a beacon frame signal received from an anchor wireless device advertising at least a first service period.

At operation 1020, the processing logic causes the client wireless device to operate in a low-power mode until the first service period.

At operation 1030, the processing logic detects, during the first service period, a command frame within a data packet received from the anchor wireless device.

At operation 1040, the processing logic causes the client wireless device to transmit, to the anchor wireless device 110, in response to the command frame, a response data packet according to a pre-programmed schedule, for the first service period, that is deconflicted with transmission of other client wireless devices of the plurality of AMP devices. Performing this deconflicting will be discussed in more detail with reference to FIGS. 11-13.

Figure 13:
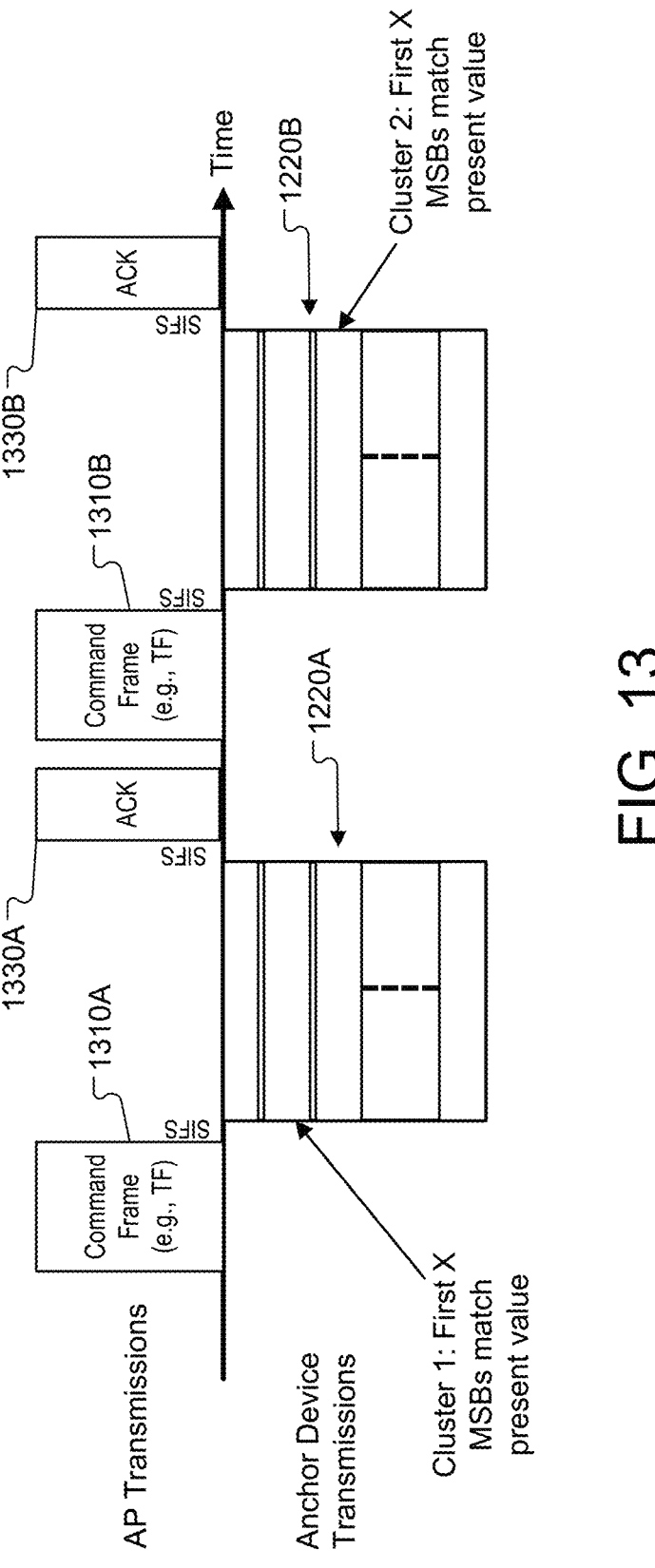
FIG. 13 is a time and frequency diagram illustrating time and frequency multiplexing by the AMP devices in communicating with the anchor wireless device according to some embodiments.

In some embodiments, with further reference to operation 1030, the anchor wireless device 110 transmits a command frame such as a trigger frame (TF), a special MU-RTS TXS trigger frame, or a special PS-Poll frame (all possible examples of a command frame herein) to the AMP devices 120. In some embodiments, the command frame includes a list of MAC addresses for the AMP devices 120 from which the anchor wireless device 110 wants to read during the next service period. In at least some embodiments, the AMP devices 120 respond according to a predetermined schedule, which the trigger frame can set in motion or otherwise initialize. In different embodiments, for example, the responses are transmitted by the AMP devices 120 staggered in time (FIG. 11), staggered in frequency (FIG. 12), or staggered in time and frequency (FIG. 13).

Figures 11, 12:
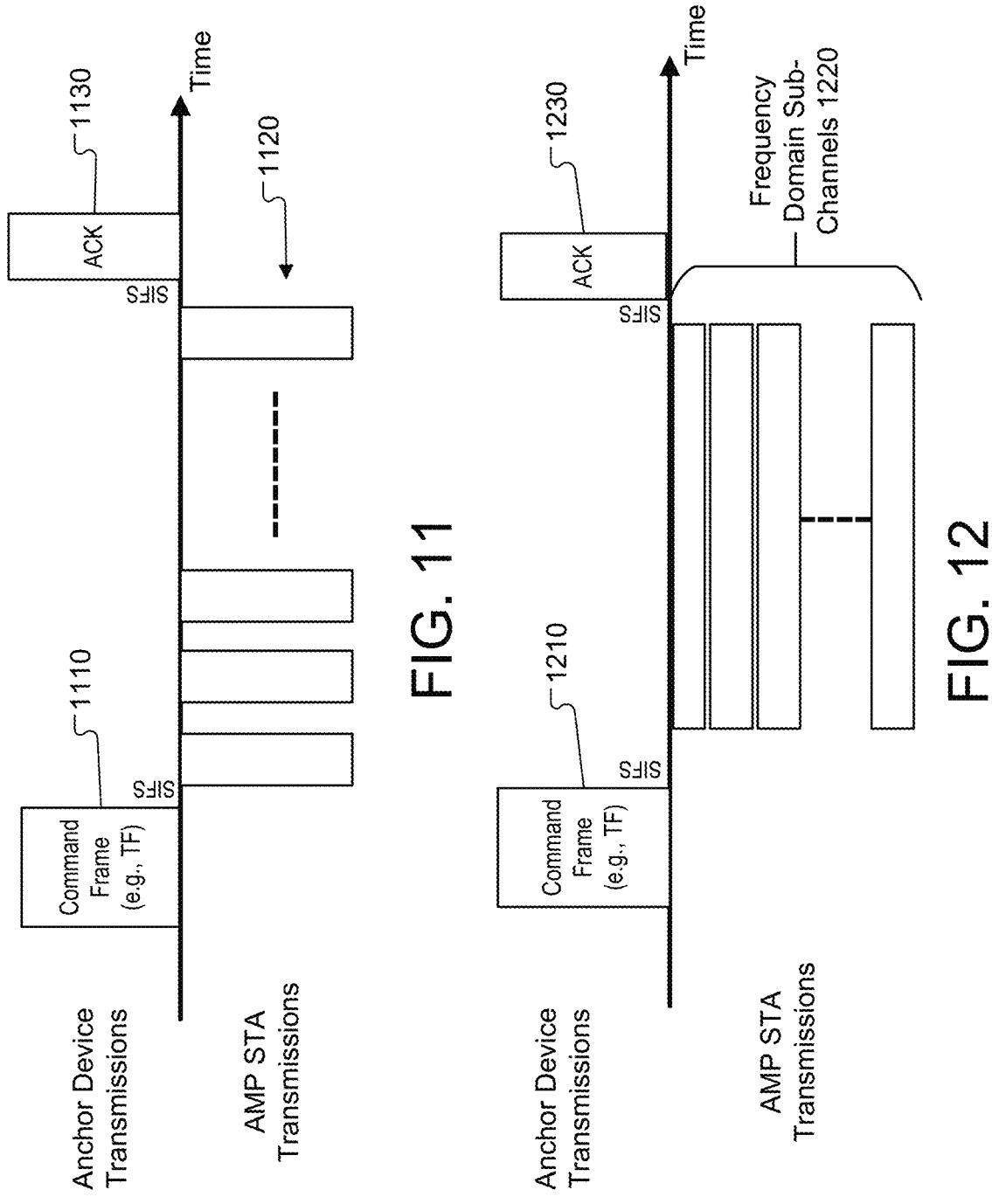
FIG. 11 is a timing diagram illustrating time-multiplexed communication by the AMP devices during a service period according to at least one embodiment.
FIG. 12 is a frequency domain diagram illustrating frequency-multiplexed communication within different sub-channels by the AMP devices during a service period according to at least one embodiment.

FIG. 11 is a timing diagram illustrating time-multiplexed communication by the AMP devices 120 during a service period according to at least one embodiment. In some embodiments, the anchor wireless device 110 transmits a command frame 1110 to at least a subset of AMP devices 120. In some embodiments, the command frame 1110 causes the AMP devices 120 to initialize a timer (see FIG. 14) to count down according to some range of each MAC address of each AMP device 120, e.g., a final set of least-significant bits (LSBs) of the MAC address. By using a final, e.g., 4-6 LSBs of the MAC address, for example, facilitates a uniform distribution of time slots 1120 (or time periods) during which different AMP devices 120 transmit their response data packets. In this way, the use of the final set of LSBs of MAC addresses provides a mechanism for deconflicting response opportunities for the AMP devices 120 with different MAC addresses. Further, as was discussed with reference to FIGS. 1A-1B and FIG. 2, it is assumed that the AMP devices 120 are being energized concurrently with or sufficiently before receiving the command frame in order to have the power to detect and respond to the command frame.

After a short interframe space (SIFS), the AMP devices 120 may begin transmitting their response data packets as their respective timers count down to the value of the final set of LSBs, for example, which is illustrated during time slots 1120. In at least some embodiments, a client wireless device (or AMP device 120) initiates a timer in response to receiving the command frame, where the command frame includes an identification of a final set of LSBs. In some embodiments, the client wireless device transmits the response data packet in response to detecting the timer reach a value matching the final set of LSBs of a MAC address of the client wireless device. Thus, in at least one embodiment, the timer includes a countdown counter that triggers the transmission of the response data packet. In some embodiments, the client wireless device loads the countdown counter with the final set of LSBs of the MAC address. The functionality of the timer and countdown may be pre-programmed into each AMP device 120. In some embodiments, the anchor wireless device 110 transmits an acknowledgement packet 1130 back to the subset of AMP devices 120 that transmitted their response data packets.

FIG. 12 is a frequency domain diagram illustrating frequency-multiplexed communication within different sub-channels by the AMP devices during a service period according to at least one embodiment. In some embodiments, the anchor wireless device 110 transmits a command frame 1210 to at least a subset of AMP devices 120. In some embodiments, the command frame 1210 includes a command to access a resource unit (RU) corresponding to a final set of LSBs of the MAC addresses of respective AMP devices 120. In some embodiments, the command frame 1210 includes an identification of the final set of LSBs to be used.

A resource unit (RU) is a unit in orthogonal frequency-division multiple access (OFDMA) terminology used in 802.11ax WLAN to denote a group of 78.125 kHz bandwidth subcarriers (tones or sub-channels) employed in both DL and UL transmissions. In some embodiments, each AMP device 120 occupies 2-3 tones (or subcarriers) of sub-channels 1220 within a frequency, which parses a frequency range into frequency domain slots. In this way, the final set of LSBs may be the arbiter of which sub-channel 1220 to use to transmit the response data packet. For example, the last 6 LSBs (64 slots) or last 4 LSBs (16 slots) of the MAC address (e.g., an ID) of the AMP devices 120 may be used to determine which RU belongs to which AMP device.

Thus, in some embodiments, a client wireless device (e.g., AMP device 120) retrieves, from the command frame, an identification of a final set of least significant bits (LSBs) of a MAC address of the client wireless device. The client wireless device may then determine, based on the final set of LSBs of the MAC address, a resource unit (RU) associated with a sub-channel and transmit the response data packet over that sub-channel. If a sufficient number of the final LSBs of the MAC address are used to denote RU, no sub-channel conflict may occur between the subset of client wireless devices concurrently transmitting over different sub-channels. In some embodiments, the anchor wireless device 110 transmits an acknowledgement packet 1230 back to the subset of AMP devices 120 that transmitted their response data packets.

FIG. 13 is a time and frequency diagram illustrating time and frequency multiplexing by the AMP devices in communicating with the anchor wireless device according to some embodiments. In some embodiments, which employs both time-multiplexing and frequency-multiplexing, the anchor wireless device 110 includes additional information in a command frame 1310A or 1310B. In some embodiments, the command frame 1310A or 1310B includes an identification of an initial set of most significant bits (MSBs) used to determine a cluster sequence, which specifies a service period, and a final set of LSBs used to determine the frequency RU assignment, as was done with reference to FIG. 12. The cluster sequences may include, for example, Cluster 1 associated with a first subset of sub-channels 1220A and Cluster 2 associated with a second subset of sub-channels 1220B, and so forth.

Thus, as an extension to the embodiment of FIG. 12, according to some embodiments, a first client wireless device (e.g., one of the AMP devices 120) retrieves, from the command frame 1310A, an identification of an initial plurality of most-significant bits (MSBs) of a MAC address of the first client wireless device. Further, in embodiments, the first client wireless determines, using the initial plurality of MSBs of the MAC address, that the first client wireless device is grouped into a first cluster (e.g., Cluster 1) of AMP device transmissions scheduled for a first service period of multiple service periods. This sequence of operations may be repeated with an initial subset of AMP devices 120 assigned to the first cluster, e.g., until Cluster 1 is populated to capacity. In some embodiments, the anchor wireless device transmits an acknowledgement packet 1330A to the initial subset of AMP devices 120.

Further, as an extension to the embodiment of FIG. 12, according to some embodiments, a second client wireless device (e.g., another one of the AMP devices 120) retrieves, from the command frame 1310B, an identification of the initial plurality of most-significant bits (MSBs) of a MAC address of the second client wireless device. Further, in embodiments, the second client wireless determines, using the initial plurality of MSBs of the MAC address, that the second client wireless device is grouped into a second cluster (e.g., Cluster 2) of AMP device transmissions scheduled for a second service period of multiple service periods. This sequence of operations may be repeated with a second subset of AMP devices 120 assigned to the second cluster. In some embodiments, the anchor wireless device transmits an acknowledgement packet 1330B to the initial subset of AMP devices 120.

Figure 14:
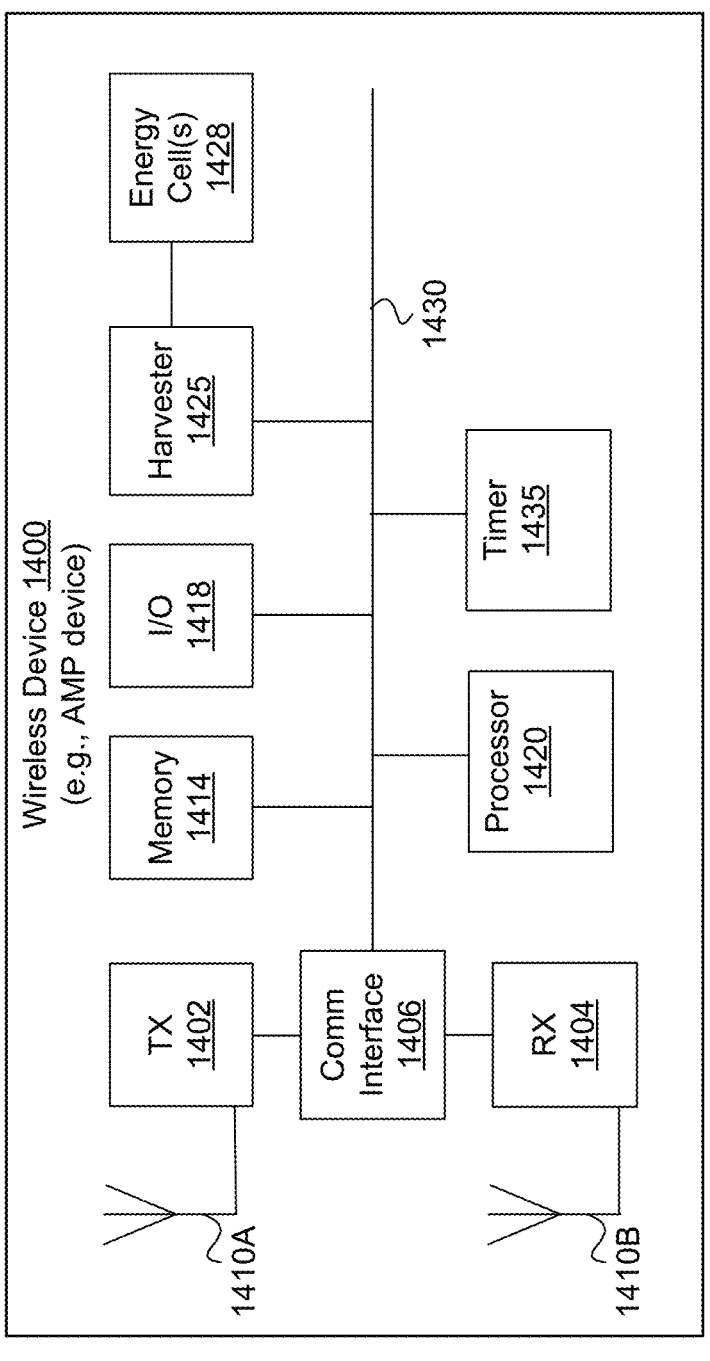
FIG. 14 is a simplified block diagram of an example wireless device, which may represent any of the client wireless devices discussed herein according to various embodiments.

FIG. 14 is a simplified block diagram of an example wireless device 1400, which may represent any of the client wireless devices discussed herein according to various embodiments. For example, the client wireless devices may include the AMP devices 120. In at least some embodiments, the wireless device 1400 includes, but is not be limited to, a transmitter 1402 or TX (e.g., a WLAN transmitter), a receiver 1404 or RX (e.g., a WLAN receiver), a communications interface 1406, a TX antenna 1410A coupled to the transmitter 1402, an RX antenna 1410B coupled to the receiver 1404, a memory 1414, one or more input/output (I/O) devices 1418 (such as a display screen, a touch screen, a keypad, and the like), a processor 1420, an energy harvester 1425, energy cells 1428, and an optional timer 1435. These components can all be coupled to a communications bus 1430. In some embodiments, aspects of the communication interface 1406 work with the processor 1420 to perform operations or that function as a processing device of the wireless device 1400. In some embodiments, there is a single antenna and multiplexing logic to switch use of the antenna between the TX and RX. In some embodiments, the timer 1435 is optional in implemented in hardware or may be implemented in software, e.g., within instruction executed out of the memory 1414.

In at least some embodiments, the memory 1414 includes storage to store instructions executable by the processor 1420 and/or data generated by the communication interface 1406. In various embodiments, frontend components such as the transmitter 1402, the receiver 1404, the communication interface 1406, and one or more antennas are adapted with or configured for WLAN and WLAN-based frequency bands, e.g., Wi-Fi®, Bluetooth® (BT), Bluetooth® Low Energy (LBE), Ultra-Wideband (UWB), Z-Wave™, Zigbee®, LoRa™, Wi-SUN®, or other wireless protocol. While some of the protocols may also be referred to as personal area network (PAN) technology, for simplicity, all are broadly referred to as WLAN technology. Future protocols are also envisioned.

In various embodiments, the communications interface 1406 is integrated with the transmitter 1402 and the receiver 1404, e.g., as a frontend of the wireless device 1401. The communication interface 1406 may coordinate, as directed by the processor 1420, to request/receive packets from other wireless devices or those that reflect off of objects. The communications interface 1406 can further process data symbols received by the receiver 1404 in a way that the processor 1420 can perform further processing, including identifying and parsing data packets received within the wireless signals.

In various embodiments, the energy harvester 1425 performs operations disclosed herein in order to capture electromagnetic or RF signals and other types of non-RF energy, e.g., light, temperature gradients, pressure differential, mechanical vibrations, wind energy, and the like, which were discussed with referenced to FIGS. 1A-1B. As discussed, the energy harvester 1425, with reference to harvesting energy from RF wireless signals, may be a multiband harvester in being configured to harvest energy from multiple ranges of frequencies that define different RF bands. In these embodiments, the energy harvester 1425 is also configured to store the harvested energy within the energy cells 1428, which then operate as a power source for the wireless device 1400.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method comprising:
transmitting, by an anchor wireless device, a beacon frame signal to a plurality of client wireless devices, which are ambient power (AMP) devices that harvest environmental energy, wherein the beacon frame signal is to advertise at least a first service period during which at least a subset of client wireless devices, of the plurality of client wireless devices, are to transmit;

transmitting, by the anchor wireless device, during the first service period, a first wireless signal comprising a data packet with a command frame to activate the subset of client wireless devices into a transmission mode; and receiving, from the subset of client wireless devices in response to detecting the command frame, second wireless signals each comprising a response data packet, wherein the second wireless signals are received according to a pre-programmed schedule that deconflict transmissions by the subset of client wireless devices.

2. The method of claim 1, wherein each response data packet is formatted as an AMP acknowledgement frame, without a legacy preamble, comprising a medium access control (MAC) address, which uniquely identifies a respective client wireless device of the subset of client wireless devices, a frame control field, and a checksum field.

3. The method of claim 1, further comprising:
receiving a first security credential appended to or located within the response data packet received from a first client wireless device of the subset of client wireless devices;

retrieving, from a data store, a second security credential that was pre-associated and pre-stored as belonging to the first client wireless device; and authenticating the first client wireless device based on the first security credential matching the second security credential.

4. The method of claim 1, further comprising:
retrieving, from a data store, an encryption key associated a first client wireless device of the subset of client wireless devices; and decrypting, using the encryption key, a first response data packet received from the first client wireless device.

5. The method of claim 1, further comprising:
retrieving, from a data store, a cryptographic hash function associated with a first client wireless device of the subset of client wireless devices;

generating a second message integrity code (MIC) by applying the cryptographic hash function to a first response data packet received from the first client wireless device; and verifying an integrity of the response data packet by comparing the second MIC to a first MIC appended to the first response data packet.

6. The method of claim 1, further comprising generating the first wireless signal with technology comprising one of Wi-Fi®, Bluetooth®, Bluetooth® Low Energy, Ultra-Wideband, Z-Wave™, Zigbee®, LoRa™, or Wi-SUN®.

7. The method of claim 1, further comprising determining an interval time between and a duration of each service period of a plurality of service periods, including the first service period, wherein the determining is based on a density of the plurality of client wireless devices and application demands for regular network traffic, and wherein the beacon frame signal is further to advertise the plurality of service periods.

8. The method of claim 6, further comprising performing channel reservation and contention to support transmission, by the plurality of client wireless devices, during the plurality of service periods, that is compliant with Wireless Local Area Network (WLAN)-based medium reservation protocols and understood by different station device types.

9. The method of claim 1, further comprising:
automatically communicating with a first type of client wireless device having a known presence during the first service period, wherein the first type of client wireless device does not respond to the command frame; and communicating with, during the first service period, a second type of client wireless device identified by the anchor wireless device just before the first service period and that is activated by the command frame into the transmission mode.

10. The method of claim 1, further comprising:
detecting a cessation in receiving the second wireless signals from client wireless devices; and transmitting a contention-free (CF) end frame to free up a transmission channel for regular network traffic during a remainder of the first service period.

11. The method of claim 1, further comprising:
retrieving, from each response data packet received from the subset of client wireless devices, an identification of a respective client wireless device;

retrieving, from a clock source, at least a day and time of reception of each response data packet; and storing, in a cloud-based data store, the identification, day and time, and a location in association with each respective client wireless device of the subset of client wireless devices.

12. A method comprising:
detecting, by a client wireless device, a beacon frame signal received from an anchor wireless device advertising at least a first service period, wherein the client wireless device is one of a plurality of ambient power (AMP) devices that harvest environmental energy;

operating, by the client wireless device, in a low-power mode until the first service period;

detecting, during the first service period, a command frame within a data packet received from the anchor wireless device; and transmitting, by the client wireless device to the anchor wireless device, in response to the command frame, a response data packet according to a pre-programmed schedule, for the first service period, that is deconflicted with transmission of other client wireless devices of the plurality of AMP devices.

13. The method of claim 12, wherein the response data packet is formatted as an AMP acknowledgement frame, without a legacy preamble, comprising a medium access control (MAC) address, which uniquely identifies a respective client wireless device of the plurality of AMP devices, a frame control field, and a checksum field.

14. The method of claim 12, further comprising encrypting, using a stored encryption key, the response data packet before transmitting the encrypted response data packet to the anchor wireless device.

15. The method of claim 12, further comprising:
applying a stored cryptographic hash function to the response data packet to generate a message integrity code (MIC); and appending the MIC to the response data packet before transmitting the response data packet to the anchor wireless device.

16. The method of claim 12, further comprising generating, by the client wireless device, a radio frequency (RF) signal containing the response data packet using technology comprising one of Wi-Fi®, Bluetooth®, Bluetooth® Low Energy, Ultra-Wideband, Z-Wave™, Zigbee®, LoRa™, or Wi-SUN®.

17. The method of claim 12, wherein transmitting the response data packet further comprises:

initiating a timer in response to receiving the command frame, wherein the command frame includes an identification of a final plurality of least-significant bits (LSBs); and transmitting the response data packet in response to detecting the timer reach a value matching the final plurality of LSBs of a MAC address of the client wireless device.

18. The method of claim 17, wherein the timer comprises a countdown counter that triggers the transmitting, the method further comprising loading the countdown counter with the final plurality of LSBs of the MAC address.

19. The method of claim 12, wherein transmitting the response data packet further comprises:

retrieving, from the command frame, an identification of a final plurality of least significant bits (LSBs) of a MAC address of the client wireless device;

determining, based on the final plurality of LSBs of the MAC address, a resource unit (RU) associated with a sub-channel; and transmitting the response data packet over the sub-channel.

20. The method of claim 19, wherein transmitting the response data packet further comprises:

retrieving, from the command frame, an identification of an initial plurality of most-significant bits (MSBs) of a MAC address of the client wireless device; and determining, using the initial plurality of MSBs of the MAC address, the client wireless device is grouped into a first cluster of AMP device transmissions scheduled for the first service period of a plurality of service periods.

21. An anchor wireless device comprising:

a transceiver to wirelessly communicate with a plurality of ambient power (AMP) devices that harvest environmental energy;

a communication interface coupled to the transceiver; and a processor coupled to the communication interface, wherein the processor is to cause the communication interface and transceiver to:

transmit a beacon frame signal to the plurality of AMP devices, wherein the beacon frame signal is to advertise at least a first service period during which at least a subset of AMP devices, of the plurality of AMP devices, are to transmit;

transmit, during the first service period, a first wireless signal comprising a data packet with a command frame to activate the subset of AMP devices into a transmission mode; and receive, from the subset of AMP devices in response to detecting the command frame, second wireless signals each comprising a response data packet, wherein the second wireless signals are received according to a pre-programmed schedule that deconflict transmissions by the subset of AMP devices.

22. A client wireless device comprising:

an energy harvester to harvest environmental energy from which to be powered;

a memory; and a processor coupled to the energy harvester and the memory, wherein the processor is to:

detect a beacon frame signal received from an anchor wireless device advertising at least a first service period;

operate in a low-power mode until the first service period;

detect, during the first service period, a command frame within a data packet received from the anchor wireless device; and transmit, to the anchor wireless device, in response to the command frame, a response data packet according to a pre-programmed schedule, for the first service period, that is deconflicted with transmission of other client wireless devices.

* * * * *